(12) United States Patent
Fingerman

(10) Patent No.: US 12,703,347 B2
(45) Date of Patent: Aug. 11, 2026

(54) VIBRATION REDUCTION MECHANISM FOR ELECTRIC DRIVE MODULE

(71) Applicant: FCA US LLC, Auburn Hills, MI (US)

(72) Inventor: Michael Fingerman, West Bloomfield, MI (US)

(73) Assignee: FCA US LLC, Auburn Hills, MI (US)

( * ) Notice: Subject to any disclaimer, the term of this patent is extended or adjusted under 35 U.S.C. 154(b) by 282 days.

(21) Appl. No.: 18/581,484

(22) Filed: Feb. 20, 2024

(65) Prior Publication Data

US 2025/0263067 A1 Aug. 21, 2025

(51) Int. Cl.
*B60W 20/40* (2016.01)

(52) U.S. Cl.
CPC ....... *B60W 20/40* (2013.01); *B60W 2710/083* (2013.01)

(58) Field of Classification Search
CPC ....................... B60K 2006/4825; B60K 6/547; B60K 6/365; B60K 6/48; B60K 6/543; B60W 20/40; F16H 2200/0013; F16H 2200/0043; F16H 2200/201; F16H 3/66; F16H 3/72; F16H 3/727; F16H 3/728
See application file for complete search history.

(56) References Cited

U.S. PATENT DOCUMENTS

2018/0208040 A1* 7/2018 Singh ...................... F16H 57/10
2019/0078666 A1* 3/2019 Duhaime ............... B60K 17/28

OTHER PUBLICATIONS

Starr, Michelle., "We Now Have The First-Ever Permanently Magnetic Liquid, And It's Absolutely Trippy," p. 1-3, https://www.sciencealert.com/scientists-have-printed-droplets-of-permanently-magnetic-liquid-and-boy-is-it-trippy (2019).

* cited by examiner

*Primary Examiner* — Luke Huynh
(74) *Attorney, Agent, or Firm* — Jeremy J. Klobucar

(57) ABSTRACT

An electric drive module for an electrified vehicle includes an electric motor, a transmission, a multispeed actuation mechanism (MAM), and a controller. The transmission is driven by a rotatable output of the electric motor and includes a first drive shaft and a second drive shaft. The transmission has a first gear set that selectively converts rotatable motion of the first drive shaft into rotatable motion of the second drive shaft in a first gear mode, and a second gear set that selectively converts rotatable motion of the first drive shaft into rotatable motion of the second drive shaft in a second gear mode. The MAM has magnetic fluid therein that activates causing selective rotatable communication between the first and second drive shafts. The controller commands activation of the MAM whereby a limited slip condition occurs between the first and second drive shafts thereby mitigating vibrations in the electric drive module.

17 Claims, 5 Drawing Sheets

VIBRATION REDUCTION MECHANISM FOR ELECTRIC DRIVE MODULE

FIELD

The present application generally relates to electrified vehicles and, more particularly, to an electric drive module that uses a vibration reduction mechanism having magnetic fluid.

BACKGROUND

An electrified vehicle (hybrid electric, plug-in hybrid electric, range-extended electric, battery electric, etc.) includes at least one battery system and at least one electric motor. Typically, the electrified vehicle would include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor.

Electrified vehicles generally include a powertrain configured to generate and transfer drive torque to a driveline of the vehicle for propulsion. The electrified powertrain generally comprises the high voltage battery system, one or more electric motors, and a transmission. The electric motors and transmission can be referred to as an electric drive module. Some electric drive modules can incorporate conventional clutch systems that allow the transmission to shift between more than one gear. Conventional clutch systems require components such as a pump, valves, solenoids to support its functions. These components can result in a power loss of the electrified powertrain as a whole. Furthermore, such clutch systems transmit undesirable noise vibration and harshness (NVH) into the vehicle based on mechanical connections between input and output shafts. Accordingly, while such electric drive modules having transmissions using conventional clutch systems do work well for their intended purpose, there exists an opportunity for improvement in the relevant art.

SUMMARY

According to one example aspect of the invention, an electric drive module for an electrified vehicle includes an electric motor, a transmission, a multispeed actuation mechanism (MAM), and a controller. The transmission is driven by a rotatable output of the electric motor and includes a first drive shaft and a second drive shaft. The transmission has a first gear set that selectively converts rotatable motion of the first drive shaft into rotatable motion of the second drive shaft in a first gear mode at a first drive ratio, and a second gear set that selectively converts rotatable motion of the first drive shaft into rotatable motion of the second drive shaft in a second gear mode at a second drive ratio, distinct from the first drive ratio. The MAM has magnetic fluid therein. Activation of the magnetic fluid causes selective rotatable communication between the first and second drive shafts. The controller commands activation of the MAM whereby a limited slip condition occurs between the first and second drive shafts thereby mitigating vibrations in the electric drive module.

In some implementations, the controller commands a predetermined amount of activation of the MAM corresponding to a predetermined acceptable level of vibrations.

In additional arrangements, the controller commands activation of the MAM thereby reducing torque fluctuations within the electric drive module.

In additional features, the magnetic fluid includes ferromagnetic nanoparticles suspended therein. The MAM is configured to receive an activation signal from the controller based on sensor inputs of the electrified vehicle indicative of a shift change request.

In some implementations, the MAM further includes a first disk and a second disk. Activation of the magnetic fluid results in the first and second disks moving from a disengaged position to an at least partially engaged position. The first gear set comprises a first gear configured to rotate with the first drive shaft and a second gear that is configured to selectively drive the second drive shaft in a first gear mode. The second gear set comprises a first gear configured to rotate with the first drive shaft and a second gear that is configured to selectively rotate with the second drive shaft in a second gear mode.

In additional arrangements, the first and second disks at least partially engage to couple for rotation the first drive shaft with the first gear of the second gear set. The second drive shaft is rotatably coupled to drive axles that drive respective drive wheels through a differential.

According to another example aspect of the invention, an electric drive module for an electrified vehicle includes a transmission and a multispeed actuation mechanism (MAM). The transmission is driven by a rotatable output of an electric motor and includes a first drive shaft and a second drive shaft. The transmission has a first gear set that selectively converts rotatable motion of the first drive shaft into rotatable motion of the second drive shaft in a first gear mode at a first drive ratio, and a second gear set that selectively converts rotatable motion of the first drive shaft into rotatable motion of the second drive shaft in a second gear mode at a second drive ratio, distinct from the first drive ratio. The MAM has a first disk rotatably coupled to an input shaft and a second disk rotatably coupled to an output shaft. The MAM includes magnetic fluid therein. Activation of the magnetic fluid causes the first and second disks to rotate concurrently and a shift to occur within the transmission from the first gear set to the second gear set.

In some implementations, the magnetic fluid includes ferromagnetic nanoparticles suspended therein. The MAM is configured to receive an activation signal from a controller based on sensor inputs of the electrified vehicle indicative of a shift change request.

In some implementations, the first gear set comprises a first gear configured to rotate with the first drive shaft and a second gear that is configured to selectively drive the second drive shaft in the first gear mode. The second gear set comprises a first gear configured to rotate with the first drive shaft and a second gear that is configured to selectively rotate with the second drive shaft in the second gear mode.

In additional arrangements, the first and second disks engage to couple for rotation the first drive shaft with the first gear of the second gear set. The second drive shaft is rotatably coupled to drive axles that drive respective drive wheels through a differential.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, an electrified powertrain generally includes a high voltage battery system, one or more electric motors, and a transmission. The electric motors and transmission can be referred to as an electric drive module. Some electric drive modules can incorporate conventional clutch systems that allow the transmission to shift between more than one gear. Conventional clutch systems require components such as a pump, valves, solenoids to support its functions. These components can result in a power loss of the electrified powertrain as a whole. Furthermore, such clutch systems transmit undesirable noise vibration and harshness (NVH) into the vehicle based on mechanical connections between input and output shafts.

Accordingly, the instant application provides a multispeed actuation mechanism (MAM) instead of a conventional clutch to control a shift between gears and reduce NVH. The MAM disclosed herein uses magnetic fluid to engage and disengage rotating members (such as disks) to allow for connection of desired gears. In examples, the magnetic fluid consists of ferromagnetic nanoparticles suspended in fluid. Activation of the magnetic fluid can cause the liquid to change shape and thereby cause first and second shafts to move from a disengaged position to an at least partially engaged position for communicating rotation from the first shaft to the second shaft. In this regard, movement to the at least partially engaged position can cause a transmission to shift from a first gear to a second gear. The MAM is used to reduce NVH in the electrified powertrain and vehicle as a whole. The MAM uses the magnetic fluid to provide limited slip between the input and output for reduction of torque fluctuations resulting in a reduction in NVH. The amount of limited slip is controlled and predetermined by acceptable vibration levels. The reduction in torsional vibrations provided by the MAM can be experienced by a driver making the driving experience smoother and more desirable.

The MAM makes such shifting between engaged and disengaged positions smooth to the vehicle operator. As used herein an "engaged" position can be defined as a limited slip condition between an input and output such that less than 100% of drive torque is transmitted from the input and output. By allowing the inputs and outputs to at least partially slip, NVH is improved. The amount of limited slip condition is controlled by a controller and facilitates the reduction in NVH. Use of the MAM instead of conventional friction clutches improves efficiency of the electric drive module significantly because of elimination of various components including any pumps, valves, friction and separator plates and solenoids needed for a conventional friction clutch. In addition, incorporation of a MAM according to the present disclosure reduces weight of the drive module.

Figure 1:
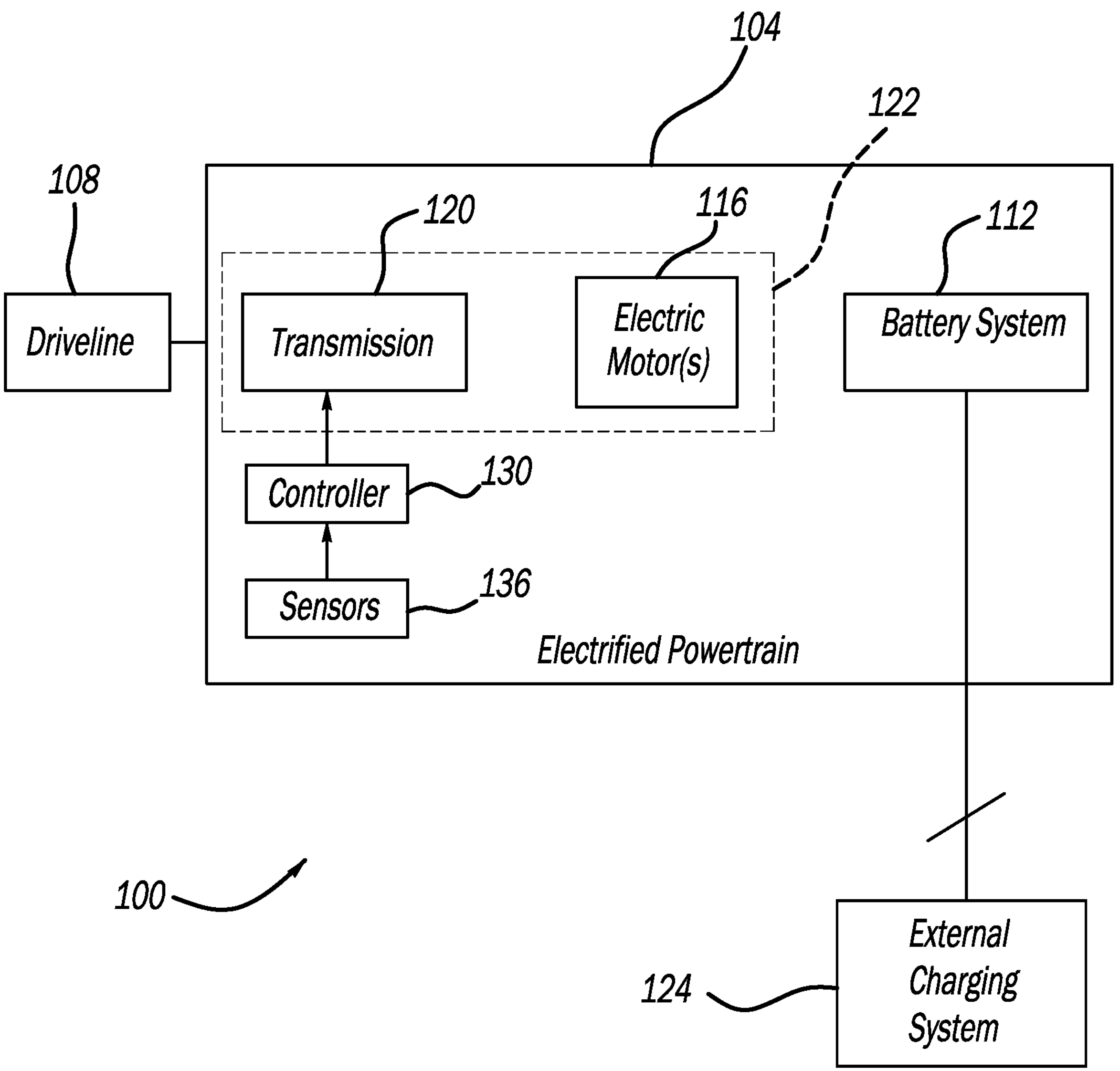
FIG. 1 is a functional block diagram of an electrified vehicle having an electric drive module according to the principles of the present application.

Referring now to FIG. 1, a functional block diagram of an example electrified vehicle 100 (also referred to herein as "vehicle 100") according to the principles of the present application is illustrated. The vehicle 100 includes an electrified powertrain 104 configured to generate and transfer drive torque to a driveline 108 of the vehicle 100 for propulsion. The electrified powertrain 104 generally comprises a high voltage battery system 112 (also referred to herein as "battery system 112"), one or more electric motors 116, and a transmission 120. The one or more electric motors 116 and the transmission 120 can be collectively referred to herein as an electric drive module 122. The battery system 112 is selectively connectable (e.g., by the driver) to an external charging system 124 (also referred to herein as "charger 124") for charging of the battery system 112. The transmission 120 receives signals from a controller 130 indicative of a shift request based on information obtained by sensors 136 throughout the vehicle.

Figure 2:
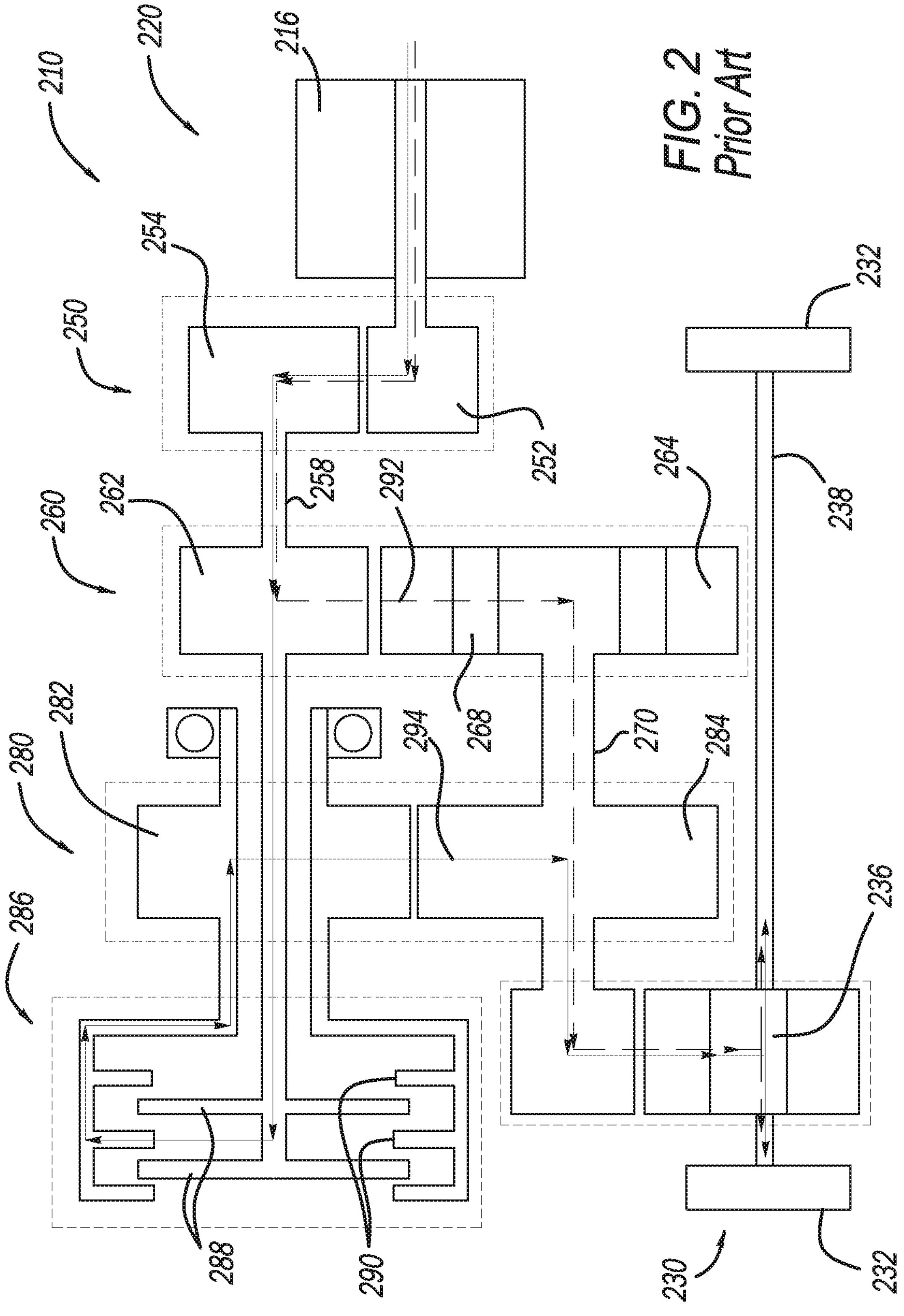
FIG. 2 is a schematic illustration of an electric drive module incorporating a conventional friction clutch according to one Prior Art example.
Figure 3:
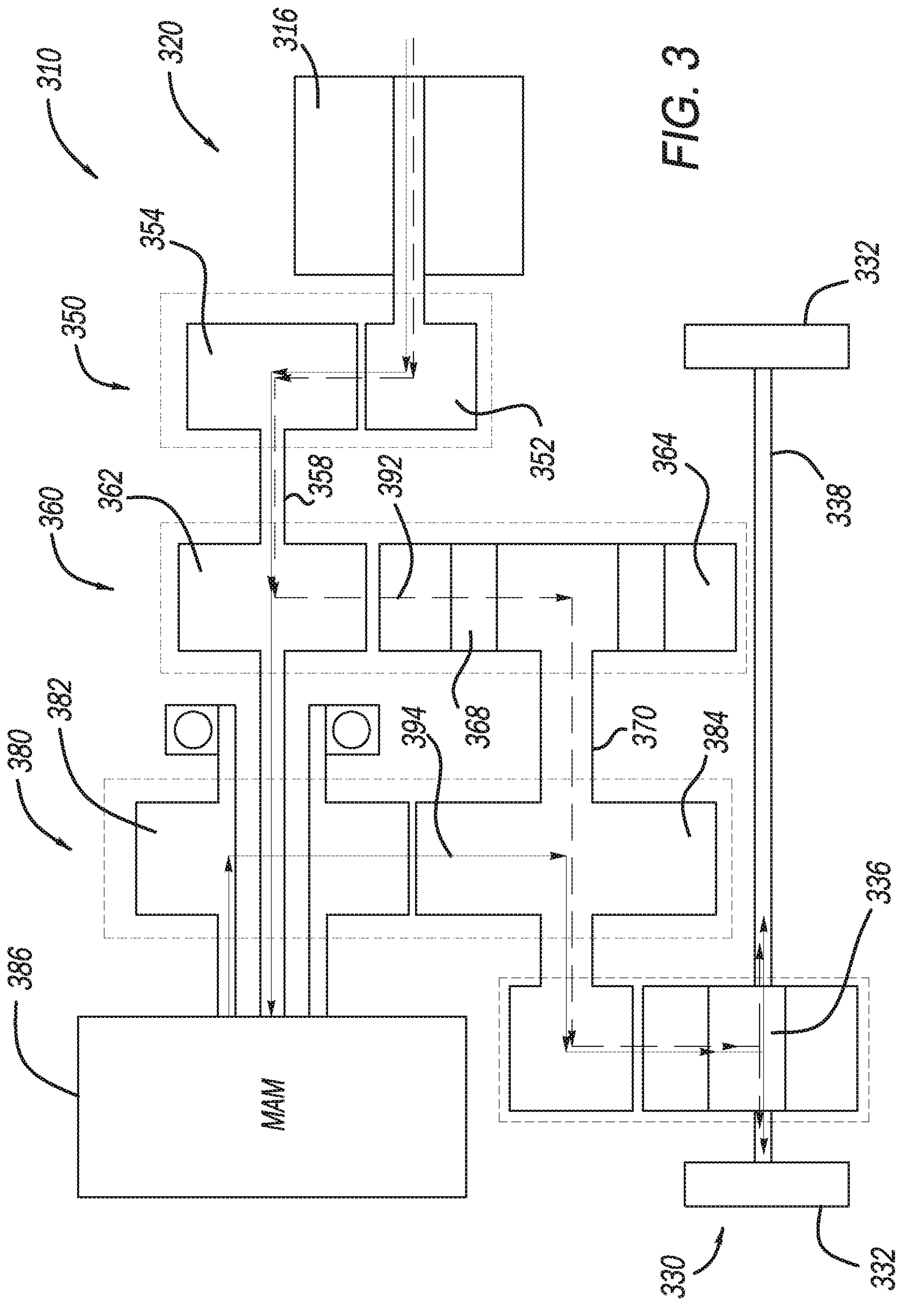
FIG. 3 is a schematic illustration of an electric drive module incorporating a multispeed actuation mechanism (MAM) according the principles of the present application.

Referring now to FIG. 2, an exemplary drive module constructed in accordance to one Prior Art example is shown and generally identified at reference numeral 210. The exemplary drive module 210 generally includes an electric motor 216 and a transmission 220 that sends drive torque through a driveline 230. The driveline 230 can include first and second drive wheels 232 selectively coupled through drive axles 238 through and a differential 236. Other arrangements are contemplated.

The transmission 220 can include an initial gear set 250 including a first gear 252 coupled to an output of the electric motor 216 and that rotatably drives a second gear 254 that drives a first drive shaft 258. By way of example only the initial gear set 250 can provide a gear ratio of 1.95. Other ratios are contemplated. A first gear set 260 includes a first gear 262 driven by the first drive shaft 258 and that rotates a second gear 264. In examples, a one way clutch 268 can be provided at the second gear 264. The second gear 264 can be selectively coupled for rotation with a second drive shaft 270. A second gear set 280 includes first gear 282 selectively coupled for rotation with the first drive shaft 258. A second gear 284 is coupled for rotation with the second drive shaft 270. A friction clutch 286 includes first plates 288 and second plates 290 that selectively engage to couple for rotation the first drive shaft 258 with the first gear 282 of the second gear set 280.

The drive module 210 can operate in a first gear using a torque path 292 that flows through the first gear set 260. By way of example only the first gear set 260 can provide a gear ratio of 2.63. Other ratios are contemplated. The drive module 210 can operate in a second gear using a torque path 294 that flows through the second gear set 280. A shift from the first torque path 292 to the second torque path 294 can result in actuation of the friction clutch 286. When the first plates 288 and second plate 290 move from a disengaged position to an engaged position, the first drive shaft 258 is fixed for rotation with the first gear 282 of the second gear set 280. The first gear 282 in turn rotates the second gear 284 of the second gear set 280. By way of example only the second gear set 280 can provide a gear ratio of 1.25. Other ratios are contemplated. In examples, the clutch 268 can also be activated thereby eliminating a torque transfer from the first gear 262 of the first gear set 260 to the second drive shaft 270. Instead, the drive shaft 270 is driven by the second gear set 280 including the first and second gears 282 and 284.

Referring now to FIGS. 3-6, an exemplary drive module constructed in accordance to one example of the present disclosure is shown and generally identified at reference numeral 310. The exemplary drive module 310 generally includes an electric motor 316 and a transmission 320 that sends drive torque through a driveline 330. The driveline 330 can include first and second drive wheels 332 selectively coupled through drive axles 338 through and a differential 336. Other arrangements are contemplated.

The transmission 320 can include an initial gear set 350 including a rotatable output or first gear 352 coupled to an output of the electric motor 316 and that rotatably drives a second gear 354 that drives a first drive shaft 358 in a first gear mode. By way of example only the initial gear set 350 can provide a gear ratio of 1.95. Other ratios are contemplated. A first gear set 360 includes a first gear 362 driven by the first drive shaft 358 and that rotates a second gear 364 in the first gear mode. In examples, a one way clutch 368 can optionally be provided at the second gear 364. The second gear 364 can be selectively coupled for rotation with a second drive shaft 370. A second gear set 380 includes first gear 382 selectively coupled for rotation with the first drive shaft 358. A second gear 384 is coupled for rotation with the second drive shaft 370. A MAM 386 can include a first disk 420 and a second disk 430 (FIG. 6) that selectively engage to couple for rotation an input 422 (the first drive shaft 358) with an output 432 (the first gear 382 of the second gear set 380).

The drive module 310 can operate in a first gear using a torque path 392 that flows through the first gear set 360. By way of example only the first gear set 360 can provide a gear ratio of 2.63. Other ratios are contemplated. The drive module 310 can operate in a second gear mode using a torque path 394 that flows through the second gear set 380. A shift from the first torque path 392 to the second torque path 394 can result in activation (such as from a signal from the controller 130 indicative of a shift request) of the MAM 386.

When the first and second disks 420 and 430 move from a disengaged position to an engaged position (again "engaged" can mean a limited slip condition where less than 100% of torque is communicated from input to output), the first drive shaft 358 is fixed or substantially fixed for rotation with the first gear 382 of the second gear set 380. In other words, the first and second disks 420 and 430 may not physically touch each other. Instead, the magnetic fluid 410, when activated, causes the first and second disks 420 and 430 to become at least partially rotatably fixed.

The first gear 382 in turn rotates the second gear 384 of the second gear set 380. By way of example only the second gear set 380 can provide a gear ratio of 1.25. Other ratios are contemplated. In examples, the clutch 368 can also be activated thereby eliminating a torque transfer from the first gear 362 of the first gear set 360 to the second drive shaft 370. Instead, the drive shaft 370 is driven by the second gear set 380 including the first and second gears 382 and 384.

Figure 4:
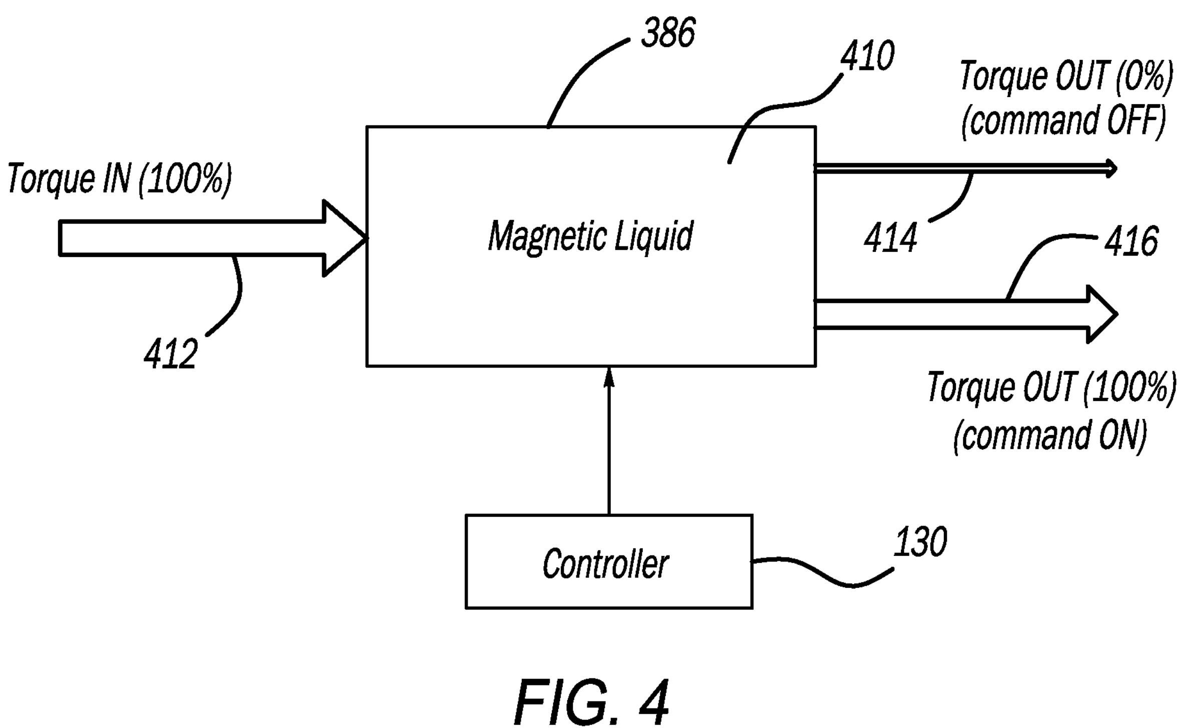
FIG. 4 is an exemplary torque input and output model using the MAM of FIG. 3 according to the principles of the present application.
Figure 5:
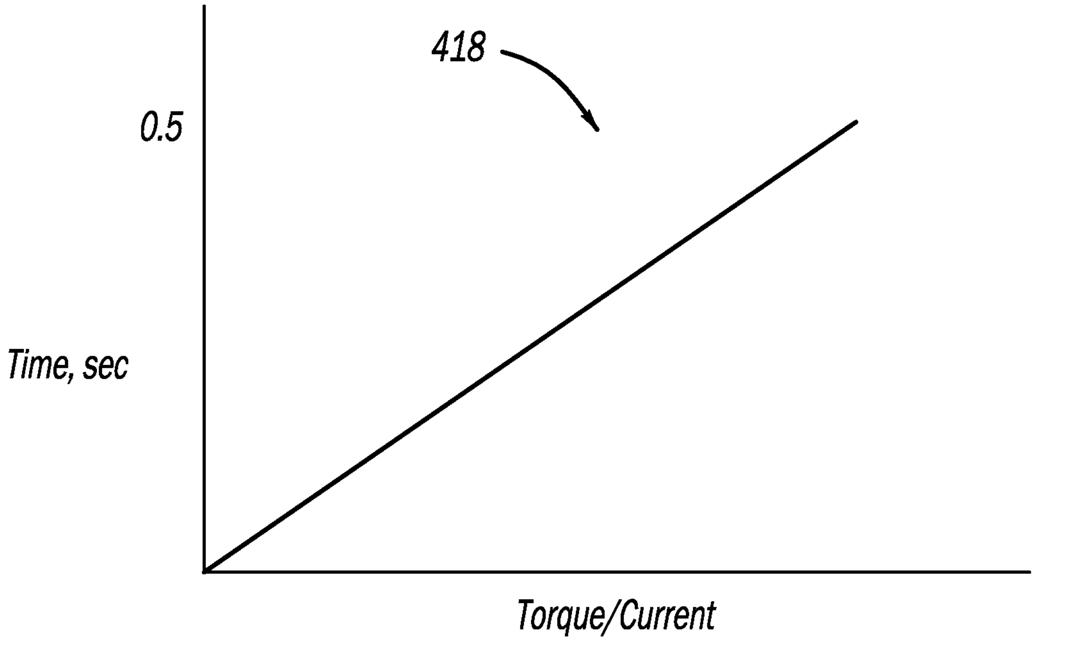
FIG. 5 is an exemplary plot showing torque/current versus time for the MAM of FIG. 3 according to principles of the present application.
Figure 6:
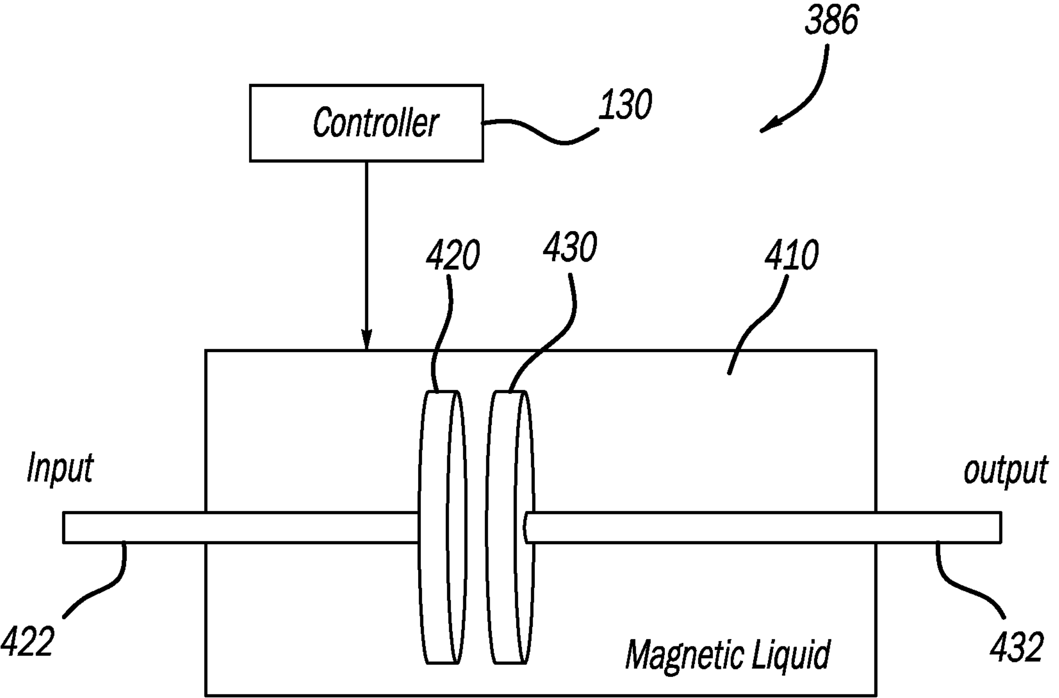
FIG. 6 is an exemplary schematic illustration of the MAM of FIG. 3 according to principles of the present application.

With particular reference to FIG. 4, the MAM 386 is shown having magnetic liquid 410 therein. Activation of the magnetic liquid 410 resulting from a signal from the controller 130 causes a torque input 412 to go from a torque output 414 of zero, to a torque output 416 of near 100%. As shown in the plot 418 of FIG. 5, the torque output is linear based on activation moving the MAM 386 from a disengaged to engaged position very quickly and smoothly. In some examples a gear shift can occur in around 0.5 seconds.

Returning to FIG. 6, the amount of limited slip is controlled by the controller 130 and predetermined by acceptable vibration levels. In other words, the controller 130 determines an amount of limited slip (less than 100% torque transmitted from the input 422 to the output 432 while the first and second disks 420 and 430 at least partially slip) based on a predetermined acceptable vibration level. The predetermined acceptable vibration level can be a predetermined slip value according to a lookup table, or can be an active sensor where vibrations are measured and the controller 130 responsively reacts to increase slip between the disks 420 and 430 to reduce vibrations in the system. The reduction in torsional vibrations provided by the MAM 410 can be experienced by a driver making the driving experience smoother and more desirable. The amount of limited slip condition controlled by the controller 130 facilitates the reduction in NVH.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electric drive module for an electrified vehicle, the electric drive module comprising:

an electric motor having a rotatable output;

a transmission that is driven by the rotatable output and includes a first drive shaft and a second drive shaft, the transmission having a first gear set that selectively converts rotatable motion of the first drive shaft into rotatable motion of the second drive shaft in a first gear mode at a first drive ratio, and a second gear set that selectively converts rotatable motion of the first drive shaft into rotatable motion of the second drive shaft in a second gear mode at a second drive ratio, distinct from the first drive ratio;

a multispeed actuation mechanism (MAM) having magnetic fluid therein wherein activation of the magnetic fluid causes selective rotatable communication between the first and second drive shafts; and a controller that commands activation of the MAM whereby a limited slip condition occurs between the first and second drive shafts thereby mitigating vibrations in the electric drive module.

2. The electric drive module of claim 1, wherein the controller commands a predetermined amount of activation of the MAM corresponding to a predetermined acceptable level of vibrations.

3. The electric drive module of claim 1, wherein the controller commands activation of the MAM thereby reducing torque fluctuations within the electric drive module.

4. The electronic drive module of claim 1, wherein the magnetic fluid includes ferromagnetic nanoparticles suspended therein.

5. The electronic drive module of claim 1, wherein the MAM is configured to receive an activation signal from the controller based on sensor inputs of the electrified vehicle indicative of a shift change request.

6. The electronic drive module of claim 1, wherein the MAM further comprises:

a first disk; and a second disk, wherein activation of the magnetic fluid results in the first and second disks moving from a disengaged position to an at least partially engaged position.

7. The electronic drive module of claim 6, wherein the first gear set comprises a first gear configured to rotate with the first drive shaft and a second gear that is configured to selectively drive the second drive shaft in a first gear mode.

8. The electronic drive module of claim 7, wherein the second gear set comprises a first gear configured to rotate with the first drive shaft and a second gear that is configured to selectively rotate with the second drive shaft in a second gear mode.

9. The electronic drive module of claim 8, wherein the first and second disks at least partially engage to couple for rotation the first drive shaft with the first gear of the second gear set.

10. The electronic drive module of claim 1, wherein the second drive shaft is rotatably coupled to drive axles that drive respective drive wheels through a differential.

11. An electric drive module for an electrified vehicle, the electric drive module comprising:

a transmission that is driven by an output of an electric motor and includes a first drive shaft and a second drive shaft, the transmission having a first gear set that selectively converts rotatable motion of the first drive shaft into rotatable motion of the second drive shaft in a first gear mode at a first drive ratio, and a second gear set that selectively converts rotatable motion of the first drive shaft into rotatable motion of the second drive shaft in a second gear mode at a second drive ratio, distinct from the first drive ratio; and a multispeed actuation mechanism (MAM) having a first disk rotatably coupled to an input shaft and a second disk rotatably coupled to an output shaft, wherein the MAM includes magnetic fluid therein wherein activation of the magnetic fluid causes the first and second disks to at least partially rotate concurrently whereby a limited slip condition occurs between the first and second drive shafts thereby mitigating vibrations in the electric drive module.

12. The electronic drive module of claim 11, wherein the magnetic fluid includes ferromagnetic nanoparticles suspended therein.

13. The electronic drive module of claim 11, wherein the MAM is configured to receive an activation signal from a controller based on sensor inputs of the electrified vehicle indicative of a limited slip change request.

14. The electronic drive module of claim 13, wherein the first gear set comprises a first gear configured to rotate with the first drive shaft and a second gear that is configured to selectively drive the second drive shaft in a first gear mode.

15. The electronic drive module of claim 14, wherein the second gear set comprises a first gear configured to rotate with the first drive shaft and a second gear that is configured to selectively rotate with the second drive shaft in a second gear mode.

16. The electronic drive module of claim 15, wherein the first and second disks at least partially engage to couple for rotation the first drive shaft with the first gear of the second gear set.

17. The electronic drive module of claim 16, wherein the second drive shaft is rotatably coupled to drive axles that drive respective drive wheels through a differential.

* * * * *